United States Patent [19]

Smith et al.

[11] Patent Number: 4,890,268

[45] Date of Patent: Dec. 26, 1989

[54] TWO-DIMENSIONAL PHASED ARRAY OF ULTRASONIC TRANSDUCERS

[75] Inventors: Lowell S. Smith, Schenectady; William E. Engeler, Scotia; Matthew O'Donnell, Schenectady, all of N.Y.

[73] Assignee: General Electric Company, Schenectady, N.Y.

[21] Appl. No.: 289,942

[22] Filed: Dec. 27, 1988

[51] Int. Cl.[4] ............................................... H04B 1/02

[52] U.S. Cl. .................................... 367/138; 367/103; 367/155; 310/334

[58] Field of Search ............... 367/103, 138, 155, 119; 310/334

[56] References Cited

U.S. PATENT DOCUMENTS

| | | | |
|---|---|---|---|
| 2,484,626 | 10/1949 | Keller | 367/155 |
| 2,601,300 | 6/1952 | Klein | 367/155 |
| 4,564,980 | 1/1986 | Diepers | 310/334 |

*Primary Examiner*—Deborah L. Kyle

*Assistant Examiner*—J. Woodrow Eldred

*Attorney, Agent, or Firm*—Geoffrey H. Krauss; James C. Davis, Jr.; Marvin Snyder

[57] ABSTRACT

A two-dimensional ultrasonic phase array is a rectilinear approximation to a circular aperture and is formed by a plurality of transducers, arranged substantially symmetrical about both a first (X) axis and a second (Y) axis and in a plurality of subarrays, each extended in a first direction (i.e. parallel to the scan axis X) for the length of a plurality of transducers determined for that subarray, but having a width of a single transducer extending in a second, orthogonal (the out-of-scan-plane, or Y) direction to facilitate dynamic focussing and/or dynamic apodization. Each subarray transducer is formed of a plurality of sheets (part of a 2-2 ceramic composite) all electrically connected in parallel by a transducer electrode applied to juxtaposed first ends of all the sheets in each transducer, while a common electrode connects the remaining ends of all sheets in each single X-coordinate line of the array.

16 Claims, 4 Drawing Sheets

TWO-DIMENSIONAL PHASED ARRAY OF ULTRASONIC TRANSDUCERS

BACKGROUND OF THE INVENTION

The present invention relates to ultrasonic imaging and, more particularly, to a novel two-dimensional phased array of ultrasonic transducer.

In many ultrasonic imaging systems, for use in medical diagnostics and the like, an array of a plurality of independent transducers is formed to extent in a single dimension (say, the X-dimension of a Cartesian coordinate system) across the length of an aperture. The energy independently applied to each of the transducers is modulated (in amplitude, time, phase, frequency and the like parameters) to form an energy beam and electronically both steer and focus that beam in a plane passing through the elongated array dimension (e.g. an X-Z plane, where the Z direction is perpendicular to the array surface). However, in a transverse Y-Z plane the beam is actually focussed at only one distance as there is a fixed mechanical lens used to obtain focus in the direction orthogonal to the elongated dimension of the array. It is highly beneficial to be able to electronically variably focus the beam in both the X-Z and Y-Z planes, i.e. in the X and Y directions perpendicular to the beam pointing (generally, Z) direction. It is desired to provide the array with an electronically-controlled two-dimensional aperture in which each of the phased array dimensions has a different role. Thus, for a beam directed in a given, e.g. Z-axis, direction, beam control in a first, or X, orthogonal direction serves to both steer and focus the radiation, while beam control in an orthogonal second, or Y, direction is utilized for focussing the beam to a point at all locations to which the beam can be steered (which can not be accomplished by a one-dimensional array). Therefore, a desired transducer array emits a radiation pattern which had distinctly different characteristics in the (X or Y) directions orthogonal to the beam (Z) direction. It is, therefore, highly desirable to provide a two-dimensional ultrasonic phased array, formed of a plurality of transducers, having steering and focussing ability in a first direction and focussing ability in an orthogonal second direction.

BRIEF SUMMARY OF THE INVENTION

In accordance with the invention, a two-dimensional ultrasonic phased array comprises a rectilinear approximation to a circular aperture formed by a plurality of transducers, each for conversion of electrical energy to mechanical motion during a transmission time interval and for reciprocal conversion of mechanical motion to electrical energy during a reception time interval. The transducers are arranged in a two-dimensional array substantially symmetrical about both a first (X) axis and a second (Y) axis. The transducers are arrayed in a plurality 2N of subarrays, each extending in a first direction (i.e. parallel to the scan axis X) and having an extent in a second, orthogonal (the out-of-scan-plane, or Y) direction selected to facilitate dynamic focussing. Each of the subarrays has a different length in the scan (X) direction, and a different plurality of transducers. The totality of the differently-shaped subarrays approximates an oval aperture, with a preselected eccentricity; in one embodiment, the eccentricity is 1, to define a circular aperture. Each subarray transducer is formed of a plurality of parallel piezoelectric sheets, in a 2—2 ceramic composite, with the sheets having a constant spacing (of about 0.6 acoustic wavelength) so that the number of sheets in a transducer varies, dependent upon the subarray in which the transducer is located. The sheets are all electrically connected in parallel by a transducer electrode applied to juxtaposed first ends of all the sheets in each transducer, while a common electrode connects the remaining ends of all elements in all transducers along each value of the scan (x) dimension of the array.

In a presently preferred embodiment, a two-dimensional transducer array for adult cardiology operates at 5 MHz., with an aperture of about 0.600″. A plurality N=4 of separate subarrays are independently provided on each side of the Y=0 array centerline. The transducer lengths and number decrease for $|Y|>0$, to provide different rectilinear subarrays which step-wise approximate a circular aperture.

Accordingly, it is one object of the present invention to provide a novel ultrasonic two-dimensional phases array of transducers.

This and other objects of the present invention will become apparent upon reading the following detailed description, when considered in conjunction with the associated drawings.

BRIEF DESCRIPTION OF THE DRAWINGS

FIG. 4b is a perspective view of an even further enlarged portion of the array portion of FIG. 4a.

DETAILED DESCRIPTION OF THE INVENTION

Figure 1A:
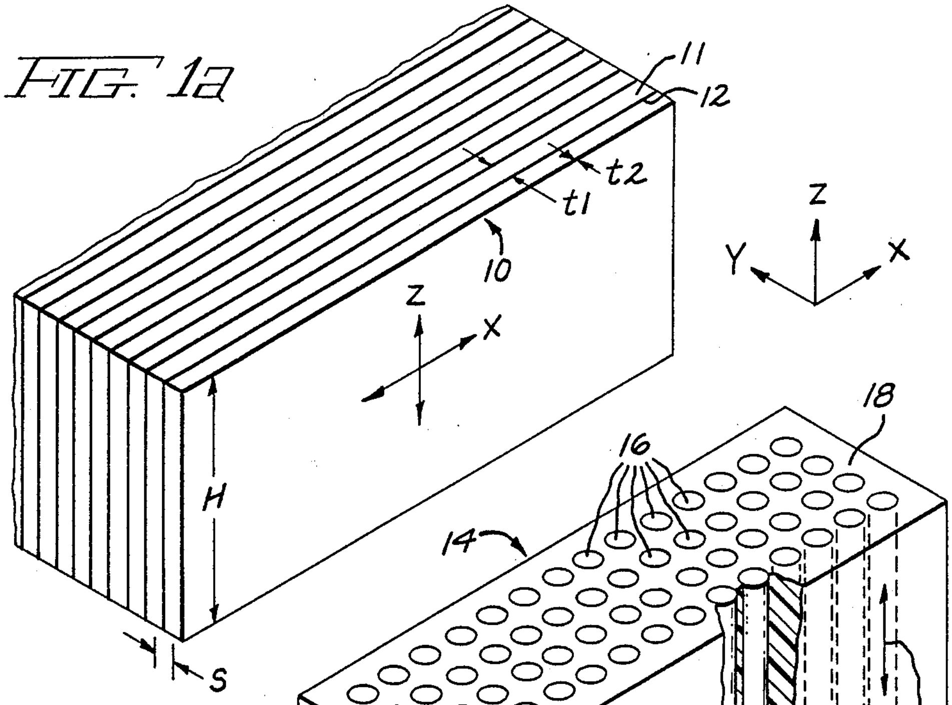
FIG. 1a is a perspective view of a block of a 2—2 composite for use in forming the transducers of the array of the present invention.
Figure 1B:
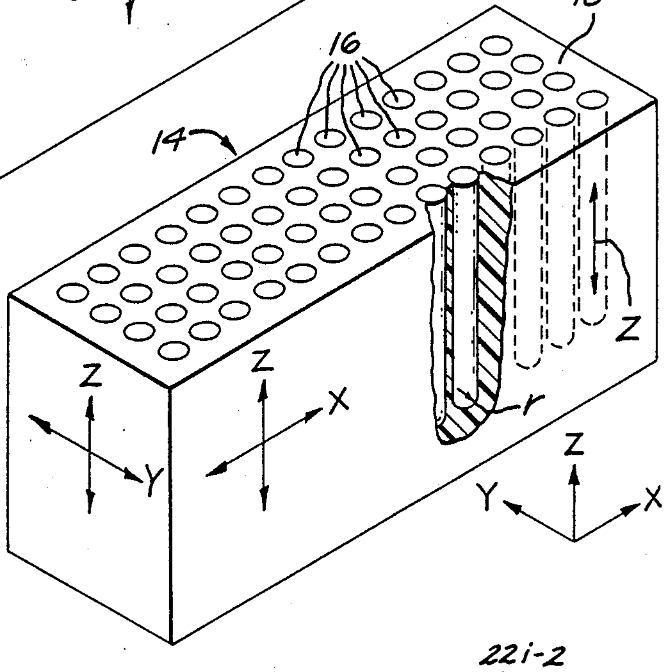
FIG. 1b (PRIOR ART)
FIG. 1b is a perspective view of a block of a 1–3 composite, as utilized in prior art transducers.

Referring initially to FIG. 1a, we presently prefer to form our novel two-dimensional transducer array from a single square (or octagonal) block 10 of a 2—2 piezoelectric ceramic composite. The block is formed with a multiplicity of sheets 11 of a piezoelectric ceramic, such as a lead zirconium titanate material (PZT-5) and the like, each having a thickness t1 (e.g. about 3 milli-inches, or mils), which is less than one-half of the acoustic wavelength at the intended ultrasonic operational frequency (e.g., 5 MHz.). Sheets 11 are separated from one another by interleaved layers 12 of an acoustically-inert polymer material, such as epoxy and the like, of thickness t2 (e.g. about 1 mil), so that the piezoelectric ceramic sheets 11 have a desired center-to-center separation S. Block 10 thus has each of the piezoelectric sheets 11 and polymer material layers 12 connected to a two-dimensional plane (here the X-Z plane), with a selected dimension in at least one of those directions, here the height H in the Z direction (e.g. H of about 20 mils). Ideally, the sheets and layers all extend in the other (X) direction over a length equal to the length of a side of a square block from which the array is to be manufactured (although an octagonal, rectangular or other shaped starting block can be used). The number of sheets 11, and interleaved layers 12, is selected so that the block thickness in the remaining (Y) direction is substantially the same as the block length in the X direction. It will be seen that each of the piezoelectric ceramic sheets 11 is substantially parallel to the adjacent sheets, but is isolated therefrom by at least one substantially coplanar polymer layer 12; each of the polymer layers 12 is itself coplanar with, but substantially isolated from, any other polymer layer. Thus, each active (piezoelectric) material sheet has a dimension greater than one acoustic wavelength in two directions (X and Z), as does each inactive connecting polymer layer. Each of piezoelectric layers 11 extends over a distance much shorter than the acoustic wavelength in only a single direction (here, the Y direction); this is particularly useful in decreasing the effective coupling of the individual sheets in that dimensions, to enhance the anisotropy of the elastic and piezoelectric constants (we define a desirable anisotropic piezoelectric material as one having a piezoelectric ratio $d33/d/31 \geqq 5$). By so forming a 2—2 composite of an isotropic piezoelectric ceramic, with at least one dimension which is small compared to an acoustic wavelength, scattering of spurious acoustic waves from the constituent materials can be prevented, especially when a plurality of "stacked" sheet members of the composite are utilized in transducers of our novel phased array. Stated somewhat differently, we have changed the structure of the piezoelectric portion of a transducer to synthetically produce an anisotropic piezoelectric member (formed of interleaved layers 12 and sheets 11) having an anisotropy greater than the relatively isotropic value (i.e. $d33/d31 \leqq 3$) that a homogeneous plate of piezoelectric ceramic, such as PZT and the like, would have if all dimensions were much greater than the acoustic wavelength.

In contrast, a prior art composite material block 14 (FIG. **1*b*) is a 1–3 composite, having a multiplicity of individual piezoelectric ceramic rods 16, elongated in only one direction (here, substantially only in the Z direction, as each rod has a radius r of dimension much less than the wavelength to be utilized), and with the rods 16 being isolated from one another by a polymer matrix 18** which is connected in all three dimensions of the Cartesian-coordinate system, and extends in multiple-wavelength dimensions in the X, Y and Z directions.

Figure 2:
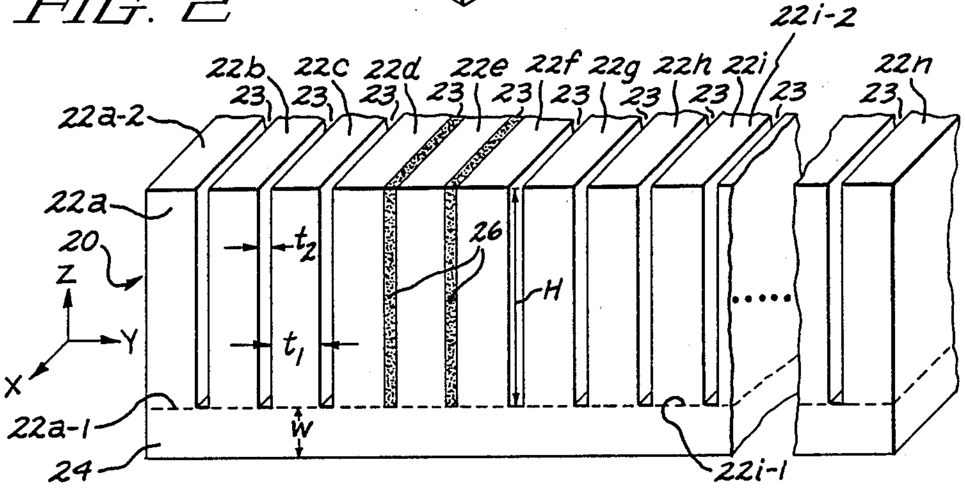
FIG. 2 is a perspective view of a portion of a 2—2 ceramic composite, illustrating one method by which the composite may be fabricated.

FIG. 2 illustrates the manner in which we presently prefer to manufacture the block 10 of 2—2 ceramic composite. A block 20, formed solely of the piezoelectric ceramic, is initially provided. A multiplicity of saw kerfs 23 are cut into block 20 to form a multiplicity of elongated solid "fingers" *22a*, *22b*, . . . , *22a*, . . . , *22n*. Each finger 22 has a substantially rectangular cross-section in all three of the X-Y, Y-Z and Z-X planes, with each finger having a first end, such as end ***22a*-1 or end *22i*-1, attached to a continuous web 24 at one end of the block, and having a opposite free end, such as end *22a*-2 or end *22i*-2. Thus, the originally-solid piezoelectric ceramic block 20 is cut to have each of the plurality of finger *22i* formed with a desired thickness function $t_1(y)$; here, this function is a substantially constant thickness $t_1$ (here about 3 mils), defined by kerfs 23 having a depth H (here, about 16 mils), and a desired width $t_2$ (here, about 1 mil) and with a web 24 of a desired thickness W (here, about 4 mils) holding all of the juxtaposed finger first ends *22i*-1. Each of the saw kerfs 23 is not back-filled with a desired epoxy polymer 26. When the polymer has set to a satisfactory degree, the end of block 20 closest to layer ends *22a*-1 is ground, until all of web 24 has been removed and the Z-axis dimension of the ground block is reduced to the desired distance H, from the surface formed by first layer ends *22i*-1 to the surface formed by the other layer ends *22i*-2**.

Figure 3:
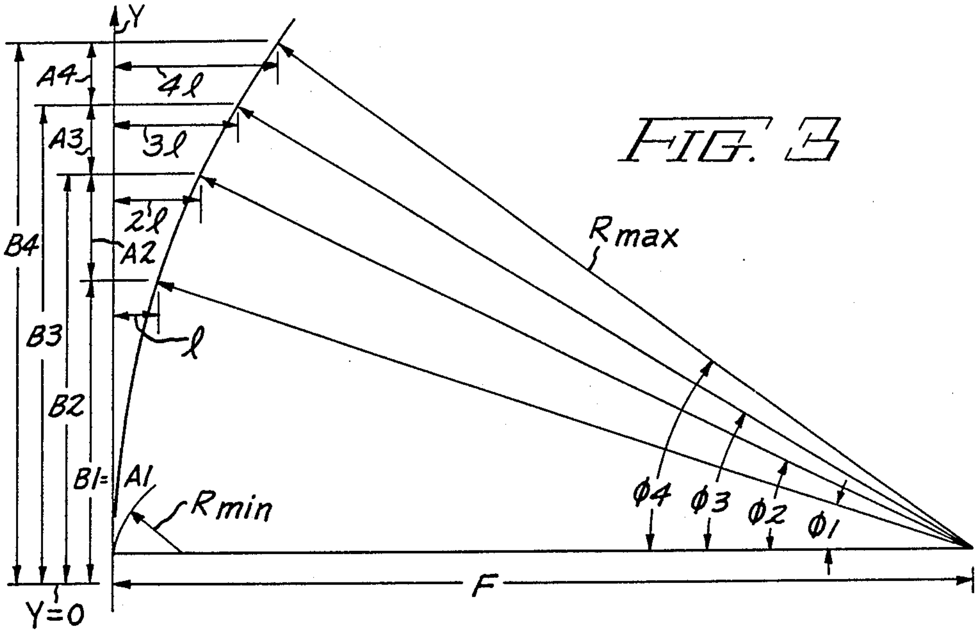
FIG. 3 is a graph illustrating the manner in which the various Y-axis dimensions of a two-dimensional Fresnel plate array are obtained.

Referring now to FIG. 3, the transducer array will form a rectilinear approximation to a circular Fresnel lens and thus have a scan/focus direction (the X axis) and a focus-only direction. The array has an extent in the focus-only direction (here the Y direction) which dictates that the number of channels, i.e. independent transducers, needed in each of the two orthogonal dimensions of the array is not equal. The number and spacing of channels in the X direction, in which steering and focussing are both achieved, must first be determined primarily by the desired aperture dimension L and a predetermined set of scanning requirements. Then, the number and spacing of channel elements in the Y dimension will be determined by the pre-established aperture dimension and the focussing requirements. The number of channels required for adequate focus in the Y direction, for a given overall aperture size L, can be obtained by computing the number N of independent focal zones an aperture will exhibit if the imaging system is restricted to a minimum f/stop and a maximum image range $R_{max}$. A parabolic approximation for phase and time delay corrections is used so that the number of independent focal zones is given by the number N of $\pi$ phase shifts between a maximum phase shift achieved at a minimum f/stop condition and a maximum phase shift achieved at a maximum range $R_{max}$. Thus, the number N of independent focal zones is given by $$N=(L/4\lambda)(1/(f/\text{stop})-L/R_{max})$$

where f/stop is the minimum f/stop (i.e., $R_{min}/L$) for the imaging system, L is the aperture length, and $R_{max}$ is the maximum image focus range. It will be seen that as the aperture dimension L is increased and the imaging wavelength $\lambda$ is decreased, the number of independent focal zones will increase beyond that number of independent focal zones (generally, $N>1$) which can be adequately approximated by a single fixed-focus lens, so that Y direction focussing begins to become a significant problem and limits the overall resolving power of any imaging system utilizing a fixed focus transducer. To overcome this resolution loss, the aperture can be segmented along the Y axis, to allow for dynamic focussing and/or dynamic apodization in the Y dimension. In general, the number of segments needed can be approximated, by a rule of thumb, as equal to the number of independent focal zones. There will then be a sufficient number of channels in the Y direction so that each transducer experiences less than a one-half wavelength change in path length from a point source located at any range of interest. An example of a Fresnel zone plate for a two-dimensional aperture, focussing with four independent zones, is shown in FIG. 3. The width of each of the four zones, from the Y=0 centerline of the array, is given by the Ay dimension, where $1 \leqq y \leqq 4$. Thus, a first zone ranges from the Y=0 centerline over a distance A1, while the second zone has an extent A2 there-beyond, and so forth. For each integer multiple of path length difference l, it will be seen that cos $\phi_y = 1-(ylF)$, so that once an average focal distance F (of a range thereof) and the path length difference l are chosen, the set of angles $\phi_y$ is calculable, given the number N of zones to be provided. Each zone is one different subarray of the master overall array. The extent, in the Y direction, of each subarray can be summed, to obtain the Y-dimension half-width By of each subarray zone. The maximum half diameter B4, for a four-zone circular lens approximation as illustrated, can further be made equal to one-half the aperture dimension (L) in the steering (X) direction. Illustratively, for a N=4 zone two-dimensional array, having a 1.5 centimeter aperture (L), the array major axis (X-dimension) diameter is about 0.600 inches and the minor-dimension Y maximum distance B4 is about 0.3 inches. For an array operating at a frequency of about 5 MHz. this translates into zone dimensions Ay respectively of: A1 of about 150 mils, A2 of about 62 mils, A3 of about 48 mils and A4 of about 40 mils.

Figure 4A:
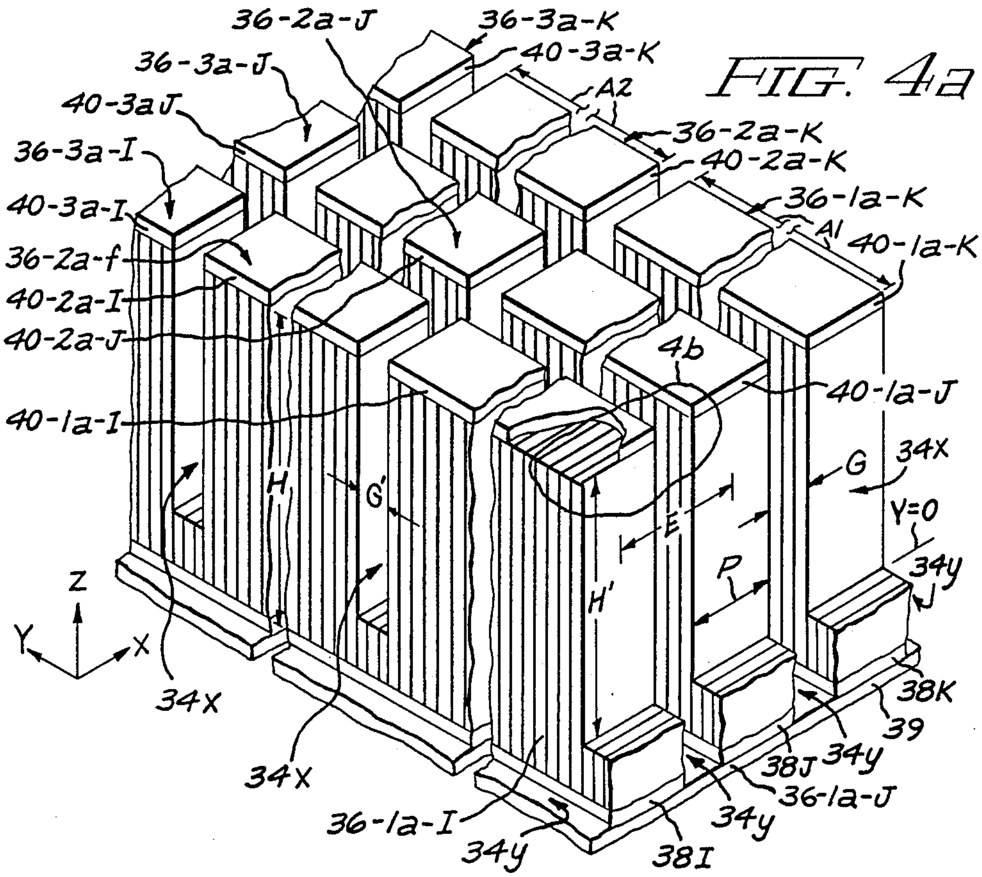
FIG. 4a is a perspective view of an enlarged portion of the array of FIG. 4.
Figure 4B:
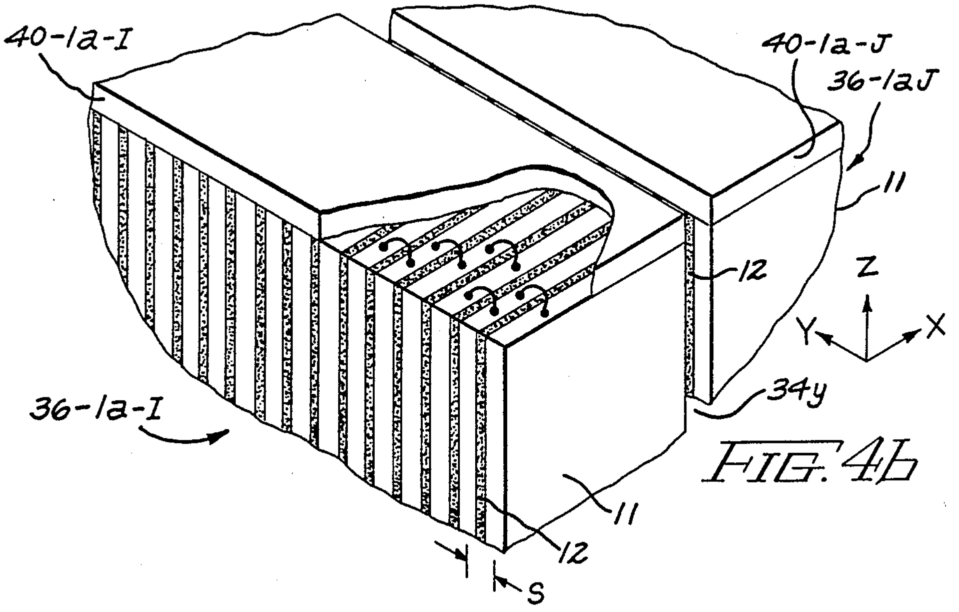
Figure 4:
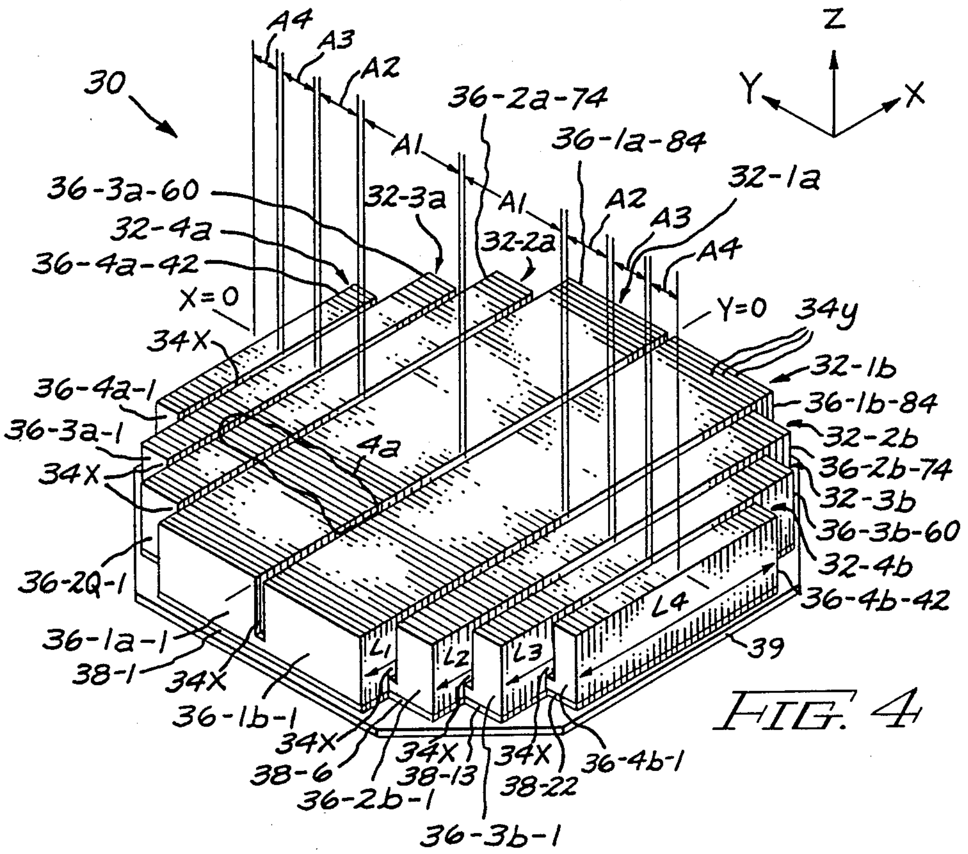
FIG. 4 is a perspective view of a multiple-transducer two-dimensional Fresnel phased array, in accordance with the principles of the present invention.

Referring now to FIGS. 4, 4*a* and 4*b*, one presently preferred embodiment of our novel two-dimensional piezoelectric transducder array 30 is provided with a plurality N (here, 4) of separate zones (here, zones 32-1, 32-2, 32-3 and 32-4) each having a pair of subarrays 32-1*a*/32-1*b*, 32-2*a*/32-2*b*, 32-3*a*/32-3*b* and 32-4*a*/32-4*b*, each with a plurality My of transducers in the major (X) dimension in each zone 32-ya or 32-yb, on either side of the Y=0 array centerline; the number My may be different in each zone, although a plurality of, but less than all, zones can have the same number of transducers (and, therefore, substantially the same length Ly) if desired. We have chosen to split the center zone 32-1 into two separate subarrays 32-1*a* and 32-1*b* to allow for speckle reduction by spatial compounding. We have not connected the transducers in like-numbered subarrays (e.g. second subarrays 32-2*a* and 32-2*b*) in the same zone but on opposite sides of the Y=0 centerline, because we allow for use of adaptive beam-forming techniques to compensate for detected sound velocity inhomogeneities in the imaging volume and for the above mentioned spatial compounding. In the chosen rectilinear approximation, illustratively for the 1.5 centimeter aperture 5 MHz. array, the number M1 of transducers in the first subarray zone is 84. The other subarray zones have lengths Ly and numbers My of transducers as follows: L2 is about 0.540" and M2=74, $L_2$ is about 0.0440" and M3=60, while L4 is about 0.314Δ and M4=42. The My transducers of each subarray are arranged symmetrically about the x=0 aperture length midpoint. A total of 520 transducers are used. It will be understood that only activateable transducers are shown in the rectilinear approximation of FIG. 4, and that non-activateable elements are not transducers (as the term "transducer" is used herein), even if such inactivateable elements are present outside the array (but within the rectangular, square, octagonal or other shape array block). The subarrays 32 are only partially separated from one another by "vertical"-disposed (i.e. X-axis-parallel) saw kerfs 34*x* which cut into the top of the block to a height H' which is about ½ to ¾ of height H, and thus do not cut completely through the block. The individual transducers in each subarray are completely separated from one another by "horizontal"-disposed (i.e. parallel to the Y-axis) saw kerfs 34*y*. That is, the array is cut into a plurality of rows of transducers, with all of the transducers in any one "horizontal" (Y-axis-parallel) row being at least partially mechanically connected (due to partial kerfs 34*x*) but completely mechanical isolated (due to full kerfs 34*y*) from adjacent rows. All of the saw-kerfs 34 are acoustically-inert gaps, typically filled with air. The individual transducers 36 in any one Y-axis line are thus semiconnected to one another via partial kerfs 34*x*, and have an array-wide common bottom electrode 38*w* (where w=. . . ,I,J,K,. . . ,H see FIG. 4*a*) but individual transducer top electrodes 40. An array member 39 underlies and stabilizes the entire array. Each transducer 36 has a full reference designation herein established as 36-Z(a or b)-1 through My, where: Z indicates the subarray zone 1-4; a or b indicates a zone with y-negative or y-positive, respectively; and mY is the maximum number of transducers in that subarray zone. Thus, a left-most subarray 32-4*a* includes transducers 36-4*a*-1 through 36-4*a*-42, all of width A4, connected by a first partial kerf 34*x* to subarray 32-3*a*. Subarray 32-3*a* has a length L3, and is comprised of transducers 36-3*a*-1 through 36-3*a*-60, all of width A3. Another partial kerf 34*x* precedes the third subarray 36-2*a*, of length L2, and comprised of transducers 36-2*a*-1 through 36-2*a*-74, all of width A2. After a third partial kerf 34*x*, the left-center transducer subarray 36-1*a*, of length L1, is comprised of transducers 36-1*a*-1 through 36-1*a*-84, while the right-central subarray 32-1*b* is comprised of transducers 36-1*b*-1 through 36-1*b*-84, and is separated from the left-central subarray by a partial saw kerf 34*x*. Subarray 32-1*b* is separated from the next subarray 32-2*b* by a fifth partial saw kerf 34*x*. Subarray 32-2*b* includes transducers 36-2*b*-1 through 36-2*b*-74 along its length L2, and is separated by another (sixth) partial saw kerf from the seventh subarray 32-3*b*, of length L3 and comprised of transducers 36-3*b*-1 through 36-3*b*-60. After a seventh, and last, X-directional partial saw kerf 34*x* (of height H' of about 12 mils), the eight subarray 32-4*b*, of length L4, has transducers 36-4*b*-1 through 36-4*b*-42. All of the subarrays are symmetrically disposed about the X=0 axis.

Referring specifically to FIG. 4*a*, it will be seen that each of the individual transducers, such as transducer 36-1*a*-J (the J-th transducer in the left-central subarray zone) is fabricated of epoxy-isolated ceramic sheets, having a transducer length P of about 5.1 mils, so that the horizontally-directed total air gaps 34*y* (e.g. between transducer 36-1*a*-J and the "vertically" adjacent transducers 36-1*a*-I and 36-1*a*-K), has a gap dimension G of about 2 mils. A similar gap dimension G for the vertically-disposed partial kerfs 34*x* may, but need not, be used. The X-direction transducer-to-transducer separation distance E is therefore about 7.1 mils, corresponding to about 0.6 acoustic wavelengths in the imaging medium, e.g. human body. It will be understood that the X-axis transducer-to-transducer spacing E is kept to about one-half wavelength to limit grating lobes, while the sheet length P-to-height H ratio is kept small enough to separate the thickness-mode resonance from the lateral-mode resonance.

Referring now particularly to FIG. 4*b*, a portion of individual transducer 36-1*a*-I is seen, with the multiplicity of piezoelectric ceramic sheets 11 separated each from the other by interleaved acoustically-inert epoxy layers 12, with sheet spacings S, and with a transducer top electrode 40-1*a*I serving to parallel-connect all of the multiplicity of sheets 11, at the ends thereof furthest from those ends connected by the row common electrode 38. It will be seen that a first subarray transducer (say, transducer 36-1*a*-I) is made up of a plurality of sheet 11 elements, so that even though the different subarray transducers have different Y-axis widths (e.g. A1=150 mils and A2=62 mils), there is no effective difference in mechanical resonance, as all transducer sheet elements are the same physical size; only the number of sheets effectively electrically connected, in parallel, changes. The entire array is located on, and stabilized by, a common member 39. Each of individual transducer top electrodes 40 and each of the X-line row electrodes 38 is separately electrically connected to a separate transducer terminal (not shown) arranged someplace about the periphery of the array, using any acceptable form of high density interconnect (HDI) techniques.

While one presently preferred embodiment of our novel two-dimension phased array of ultrasonic transducers is described in considerable detail herein, many modifications and variations will now become apparent to those skilled in the art. For example, a rectangular approximation to an oval array aperture, with B4 not equal to L/2, may be used; in fact, the square approximation (B4=L/2) of the circular array aperture may be considered as a special case (eccentricity=1) of a more general oval (eccentricity greater than or equal to 1) aperture. It is our intent, therefore, to be limited only by the scope of the appending claims, and not by the particular details and instrumentalities presented by way of explanation of one embodiment, as described herein.

What is claimed is:

1. A two-dimensional ultrasonic phased array, comprising a multiplicity of ultrasonic transducers arranged in a rectilinear approximation of a two-dimensional oval aperture with a preselected eccentricity; the array arranged with the transducers disposed substantially symmetrical about at least the first axis of the array and also arranged into a plurality 2N of subarrays, each containing at least one transducer, with the subarrays disposed about the first axis with at least one subarrays being juxtaposed to either side of said first axis and with at least one of the subarrays to either side of said first axis having a length, in a first direction substantially parallel to the first axis, different from a length of all other subarrays at an average distance from said first axis greater than the average distance of that at least one subarray; each of the transducers being separately activateable for at least one of transmission and reception of energy, to facilitate both dynamic scanning and focussing in the first direction and at least one of dynamic focussing and dynamic apodization in a second direction, orthogonal to the first direction, of a resulting energy beam.

2. The array of claim 1, wherein the number 2N of subarrays in the second direction is selected to cause less than a preselected number of $\pi$ phase shifts to occur across the aperture in the second direction at any range within a selected set of focal ranges.

3. The array of claim 2, wherein the array has a maximum aperture length L in the first direction and an acoustic wavelength $\lambda$ in the transducers, and the number N of subarrays on either side of said first axis and in said second direction is $$N=(L/4\lambda)((L/R\min)-(L/R\max))$$

where Rmin and Rmax are, respectively, minimum and maximum image focussing ranges of the array.

4. The array of claim 1, wherein the eccentricity is substantially equal to 1, and the array is a rectilinear approximation of a circle.

5. The array of claim 1, wherein the same plurality N of subarrays are arranged upon either side of an array centerline in said first direction.

6. The array of claim 5, wherein each of the resulting 2N subarrays are rectangular subarrays.

7. The array of claim 6, wherein at least one of: a length Ly, where $1 \leqq y \leqq N$; a width Ay in the second direction; and a number My, of transducers in each subarray is decreased as that subarray is located farther from the array center line.

8. The array of claim 7, wherein the subarray length, width and number of transducers all decrease in the subarray is located farther from the array center line.

9. The array of claim 8, wherein N=4.

10. The array of claim 9, for an excitation frequency of about 5 MHz., and an aperture L=0.6", having

| y—1 | Ly (inches) | Ay (inches) | My (transducers) |
|---|---|---|---|
| 1 | 0.600 | 0.150 | 84 |
| 2 | 0.540 | 0.062 | 74 |
| 3 | 0.440 | 0.048 | 60 |
| 4 | 0.314 | 0.040 | 42 |

and the eccentricity is substantially equal to 1.

11. The array of claim 1, wherein each transducer is formed of a plurality of substantially parallel, but spaced apart, sheets of piezoelectric material, with all the sheets electrically connected in parallel.

12. The array of claim 11, wherein each sheet is separated from the adjacent sheets by at least one layer of a substantially-acoustically-inert material, in a 2—2 ceramic composite.

13. The array of claim 12, wherein any pair of adjacent transducers located along a particular row of the array, parallel to the second direction, have a partial kerf cut therebetween and are least partially mechanically joined to one another.

14. The array of claim 13, wherein the partial kerfs are cut to a height H' of between about one-half and about three-quarters of the total height H of the piezoelectric ceramic of the transducer.

15. The array of claim 14, wherein all of the transducers of each array row have a common electrode, formed upon a bottom surface thereof extending in the second direction, and electrically isolated from the common electrodes of all other rows of transducers.

16. The array of claim 15, wherein each transducer has an individual electrode upon a top surface opposite to said bottom surface.

* * * * *